United States Patent [19]

Oswald et al.

[11] 3,799,362
[45] Mar. 26, 1974

[54] SIX WHEEL MATERIAL HANDLING VEHICLE

[75] Inventors: Norman Dean Oswald, Duncanville; Harry S. Mankey, Dallas, both of Tex.

[73] Assignee: Standard Manufacturing Company, Incorporated, Dallas, Tex.

[22] Filed: Jan. 22, 1973

[21] Appl. No.: 325,310

[52] U.S. Cl.............. 214/1 D, 180/6.48, 180/24.11
[51] Int. Cl. ........................................... B66c 23/56
[58] Field of Search............ 214/1 R, 1 H, 1 D, 1 Q, 214/130 R; 180/6.48, 24.08, 24.11, 66

[56] References Cited
UNITED STATES PATENTS

| | | | |
|---|---|---|---|
| 2,421,123 | 5/1947 | Jensen | 214/1 D X |
| 2,642,144 | 6/1953 | Brewer, Jr. | 180/6.48 X |
| 3,451,574 | 6/1969 | Weichel | 180/89 R X |
| 3,520,378 | 7/1970 | Slay | 180/6.48 X |
| 3,727,774 | 4/1973 | Wolfe, Jr. | 214/1 D |

*Primary Examiner*—Frank E. Werner
*Attorney, Agent, or Firm*—Richards, Harris & Medlock

[57] ABSTRACT

A six wheel material handling vehicle comprises an engine and a hydrostatic drive which functions both to propel the vehicle and to manipulate the vehicle by means of skid steering. The engine is mounted at one end of a frame, and apparatus is provided for receiving and vertically manipulating a load at the opposite end of the frame. The wheels are arranged in three pairs, with the center pair extending below a plane extending tangent to the bottoms of the wheels at the ends of the vehicle. During operation over adverse terrain, the vehicle is supported on all six wheels. During operation on a hard, smooth surface, the vehicle is supported either on the forward and center pairs of wheels or on the center and rearward pairs of wheels, depending on weight distribution.

13 Claims, 6 Drawing Figures

SIX WHEEL MATERIAL HANDLING VEHICLE

BACKGROUND AND SUMMARY OF THE INVENTION

This invention relates to a six wheel material handling vehicle, and more particularly to a material handling vehicle adapted for operation both on hard, smooth surfaces and over adverse terrain.

At the present time it is common practice to utilize hydrostatic drives in material handling vehicles, such as forklifts, aerial weapons loaders, etc. In such instances the vehicle is equipped with a prime mover, for example, an internal combustion engine, but the prime mover is not coupled directly to the apparatus which propels the vehicle, i.e., wheels, tracks, etc. Instead, the prime mover actuates one or more hydraulic pumps which in turn propel the vehicle by means of one or more hydraulic motors.

The use of a hydrostatic drive in a material handling vehicle results in numerous advantages. For example, the hydrostatic drive typically replaces a complex mechanical transmission, which heretofore has comprised a bulky, heavy, and very expensive component part of a meterial handling vehicle. Another advantage is that a hydrostatic drive typically permits operation of the vehicle at literally any desired speed in both forward and reverse directions. This is considered to be highly desirable in material handling vehicles wherein the ability to operate at a particular speed is often critical to the successful performance of the vehicle. Still another advantage relates to the fact that a hydrostatic drive equipped vehicle is usually very simple to operate. This permits operation of the vehicle by unskilled personnel with an absolute minimum of training.

A simultaneous and related trend in the design of material handling vehicles comprises the use of skid steering. This is because the hydrostatic drive of such a vehicle typically permits control over the speed and direction of operation of the propelling apparatus on one side of the vehicle independently from the speed and direction of operation of the propelling apparatus on the opposite side. This in turn results in full and complete control over the steering of the vehicle without the use of an independent steering mechanism, thereby reducing both the complexity and the cost of the vehicle. Moreover, the use of skid steering permits control over the direction of operation, the speed of operation, and the steering of the vehicle by means of the single lever. This is advantageous insofar as operation of the vehicle by unskilled personnel is concerned.

At the present time, many material handling vehicles equipped with hydrostatic drive and skid steering comprise four wheel units. Notwithstanding the foregoing advantages to be derived from the use of hydrostatic drive and skid steering in a material handling vehicle, the four wheel design exhibits a number of undesirable characteristics. Thus, in order to prevent the load which is to be received and manipulated from upsetting the vehicle, it is necessary to provide counterbalancing. This often renders the vehicle unstable when it is in the unloaded condition. Such instability can be partially corrected by providing a longer wheelbase. However, as the wheelbase is lengthened, the power necessary to effect steering is substantially increased. Excessive counterbalancing may also necessitate the use of larger tires, engines, etc. than would otherwise be required.

The present invention relates to a material handling vehicle which eliminates the foregoing undesirable characteristics of prior designs. In accordance with the broader aspects of the invention, a material handling vehicle includes a hydrostatic drive which is utilized both to propel the vehicle and to manipulate the vehicle by means of skid steering. The vehicle is provided with six wheels which are arranged along the opposite sides of the vehicle in the form of forward, center, and rearward pairs. The center pair of wheels extend somewhat below a plane extending tangent to the bottoms of the forward and rearward pairs of wheels.

During operation of the material handling vehicle over adverse terrain, the vehicle is supported by all six wheels. During operation over a hard, smooth surface, the vehicle is normally rocked rearwardly and is therefore supported by the rearward and center pairs of wheels only. This substantially shortens the effective wheelbase of the vehicle, and thereby facilitates skid steering. The vehicle includes apparatus for receiving and supporting a load at the front end thereof. When it is in the loaded condition, the vehicle is rocked forwardly and is supported by the center and forward pairs of wheels only. This also provides a relatively short effective wheelbase, whereby skid steering of the vehicle is facilitated.

In accordance with other aspects of the invention, a prime mover is mounted at the extreme rear end of the vehicle. The prime mover actuates a hydrostatic drive including a pair of hydraulic pumps and a pair of hydraulic motors each corresponding to one of the pumps. A chain drive is provided for operatively connecting each hydraulic motor to the three wheels positioned on one side of the vehicle. By this means the hydrostatic drive functions both to propel the vehicle, and to effect skid steering of the vehicle.

In accordance with still other aspects of the invention, the vehicle includes a frame comprising a pair of spaced apart forwardly extending portions. A boom is pivotally supported on the frame for manipulation between a position wherein it extends between the forwardly extending portions and a position wherein it extends over the forwardly extending portions. A lift table is mounted on the distal end of the boom and is therefore adapted to receive and support a load. The vehicle further includes an operating compartment located behind the pivotal connection of the boom to the frame and ahead of the prime mover. The operating compartment includes both controls for regulating the hydrostatic drive to propel and steer the vehicle and controls for regulating the positioning of the boom and hence the positioning of a load supported on the lift table.

DESCRIPTION OF THE DRAWINGS

A more complete understanding of the invention may be had by referring to the following detailed description when taken in conjunction with the accompanying drawings, wherein.

DETAILED DESCRIPTION

Figure 1:
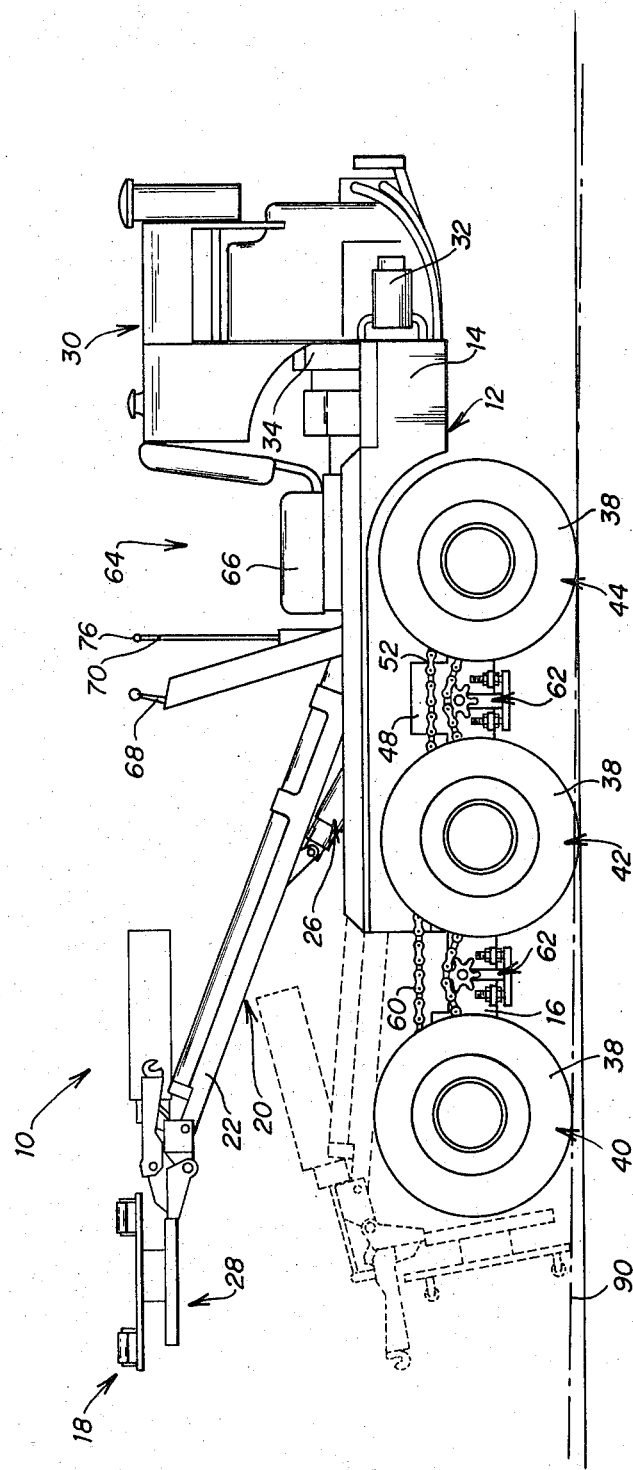
FIG. 1 is a side view of a material handling vehicle incorporating the invention.
Figure 3:
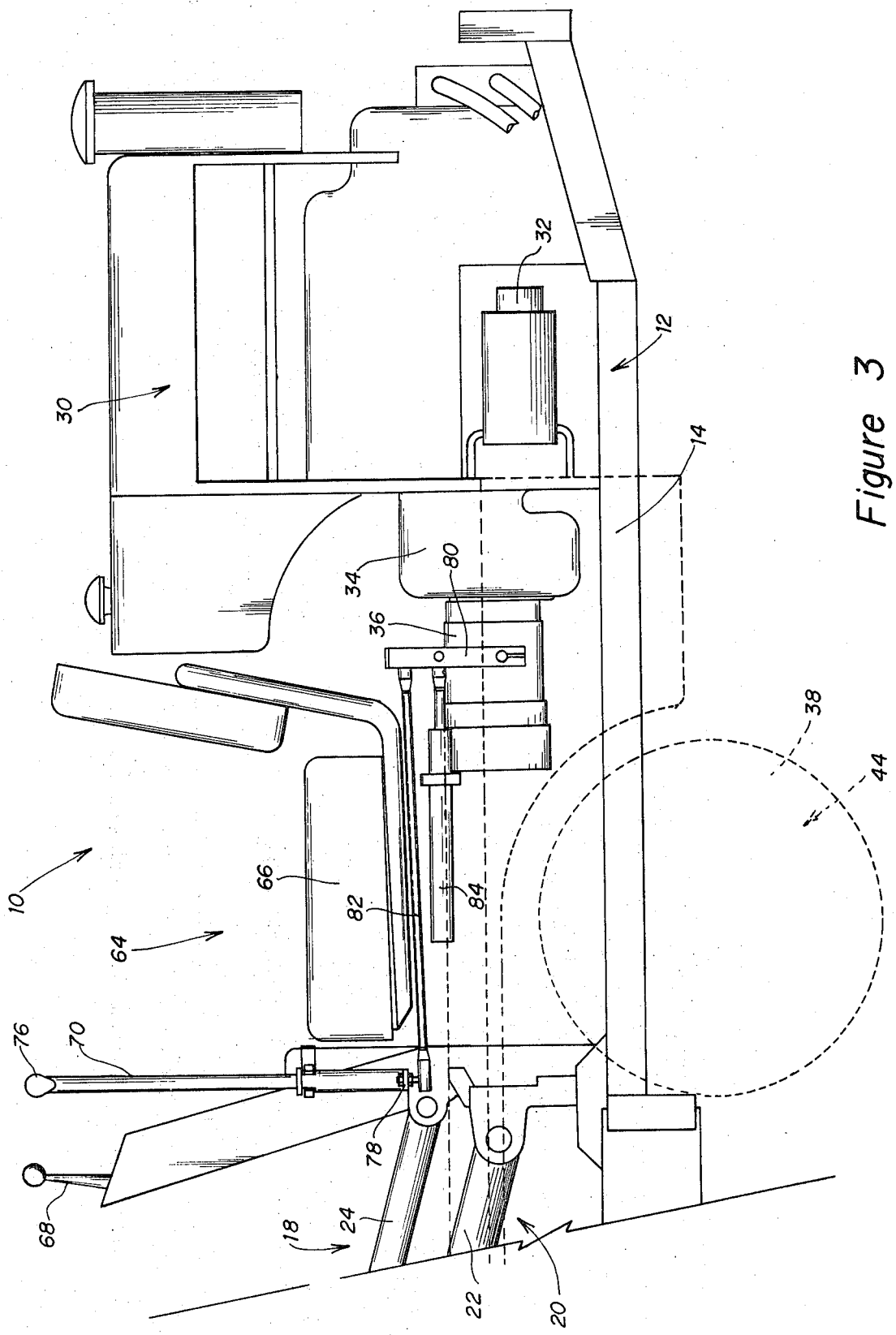
FIG. 3 is an enlarged diagrammatic view of the rear portion of the vehicle in which certain parts have been omitted more clearly to illustrate certain features of the invention.
Figure 6:
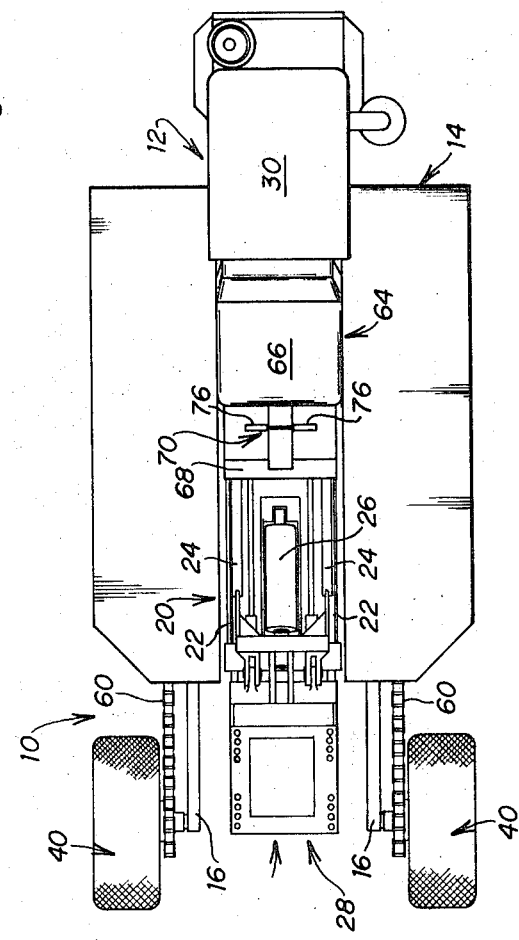
FIG. 6 is a reduced top view of the vehicle shown in FIG. 1.

Referring now to the drawings, and particularly to FIGS. 1, 3 and 6 thereof, there is shown a six wheel material handling vehicle 10 incorporating the invention. The vehicle 10 comprises a frame 12 including a main portion 14 and a pair of spaced apart portions 16 extending forwardly from the main portion 14. A load receiving and manipulating mechanism 18 is mounted on the frame 12 and is adapted for manipulation in the space extending between the forwardly extending portion 16 thereof.

Referring particularly to FIG. 3, the load receiving and manipulating mechanism 18 includes a boom 20. The boom 20 comprises a pair of main arms 22 and a pair of tension arms 24, all of which are pivotally connected to the frame 12 of the vehicle 10 at the forward end of the main portion 14. As is best shown in FIG. 1, a hydraulic cylinder 26 is connected between the frame 12 of the vehicle 10 and the boom 20 of the load receiving and manipulating mechanism 18. By this means the boom 20 is adapted for pivotal movement relative to the frame 12 between a lower position wherein it extends between the forwardly extending portions 16 of the frame, and a raised position wherein it extends over the forwardly extending portions 16 of the frame.

The load receiving and manipulating mechanism 18 further includes an article receiving and supporting apparatus 28 mounted at the distal end of the boom 20. The article receiving and supporting apparatus may comprise various conventional devices, for example, lift forks, etc. The particular article receiving and supporting apparatus 28 illustrated in the drawings comprises a lift table of the type disclosed and claimed in a copending application of Maston B. Wolfe, Jr., filed Aug. 5, 1970, Ser. No. 61,230, now U.S. Pat. No. 3,727,773, the disclosure of which is incorporated herein by reference. Such a lift table is adapted for manipulation between the positions illustrated generally in full and dashed lines in FIG. 1, whereby articles such as aerial weapons, etc., may be received on the lift table directly from flat surfaces without the use of auxiliary equipment of any type.

Referring again to FIG. 3, the material handling vehicle 10 further includes a prime mover 30 which is supported on the frame 12 at the extreme rear end thereof. The particular prime mover 30 illustrated in the Drawings comprises an air-cooled, gasoline-fired, four cylinder engine. It will be understood, however, that the prime mover may comprise other types of engines, including diesel engines, etc. The prime mover 30 may also comprise an electric motor, if desired.

The prime mover 30 drives a hydraulic pump 32 which supplies pressurized hydraulic fluid for actuating the hydraulic cylinder 26 of the load receiving and manipulating mechanism 18. The prime mover 30 also drives a gear box 34 which in turn drives a pair of hydraulic pumps 36 (only one of which is shown). The pumps 36 comprise part of a hydrostatic drive system which functions to both propel and steer the material handling vehicle 10.

Figure 4:
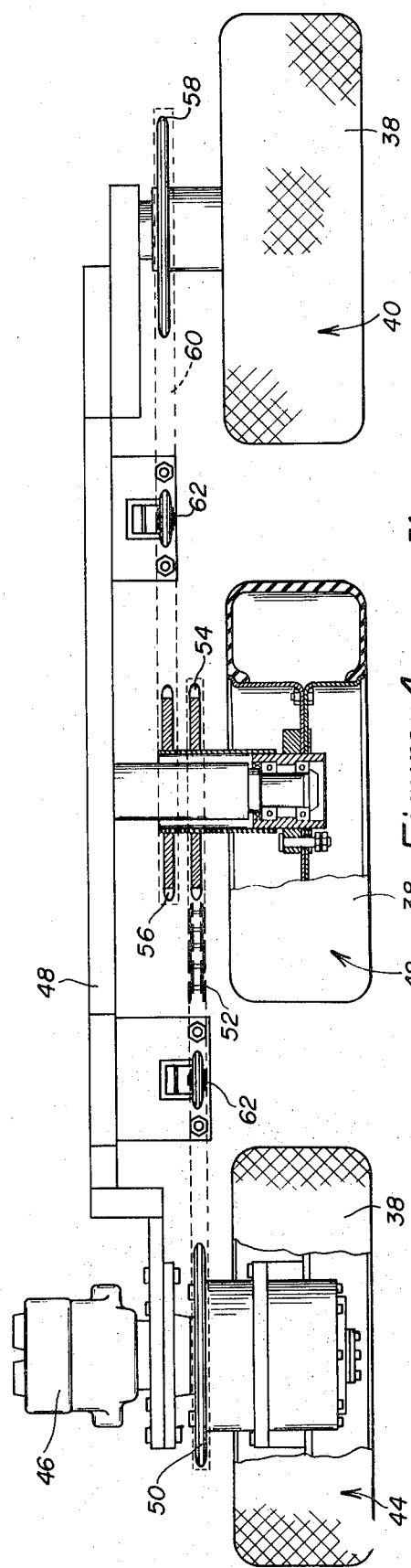
FIG. 4 is an illustration of a portion of the drive mechanism of the vehicle.

Referring now to FIGS. 1 and 4, the material handling vehicle 10 is supported on six wheels 38. The wheels 38 are arranged in three pairs, including a forward pair of wheels 40, a center pair of wheels 42, and a rearward pair of wheels 44. Considered another way, each side of the vehicle is supported by a set of three wheels positioned at spaced points therealong.

Referring particularly to FIG. 4, the hydrostatic drive of the material handling vehicle 10 includes a pair of hydraulic motors 46 each corresponging to and coupled directly to the output of one of the hydraulic pumps 36. Each motor 46 as well as the three wheels 38 corresponding thereto is supported on a subframe 48 which is adapted to be bolted directly to the frame 12 of the vehicle 10. The motor 46 on each side of the vehicle 10 is coupled directly to the corresponding rear wheel, and hence to a sprocket 50 connected to the wheel. The sprocket 50 is coupled by means of a chain 52 to a sprocket 54 connected to the center wheel of the set. A sprocket 56 is also connected to the center wheel of the set and is coupled to a sprocket 58 by means of a chain 60. The sprocket 58 is connected to the forward wheel of the set, whereby the motor 46 is operatively connected to all three wheels on one side of the vehicle 10. As is perhaps best shown in FIG. 1, tension adjusting members 62 are provided for assuring proper tension in the chains 52 and 60.

The material handling vehicle 10 further includes an operator's compartment 64 including a seat 66 positioned between the prime mover 30 and the pivotal connection of the boom 20 to the frame 12. The operator's compartment 64 is provided with means for controlling the various functions of the vehicle 10, for example, the compartment includes a valve 68 which controls the flow of hydraulic fluid from the pump 32 to the hydraulic cylinder 26. By this means the pivotal relationship of the boom 20 to the frame 12 and hence the vertical positioning of the article receiving and supporting apparatus 28 is selectively controlled.

Figure 5:
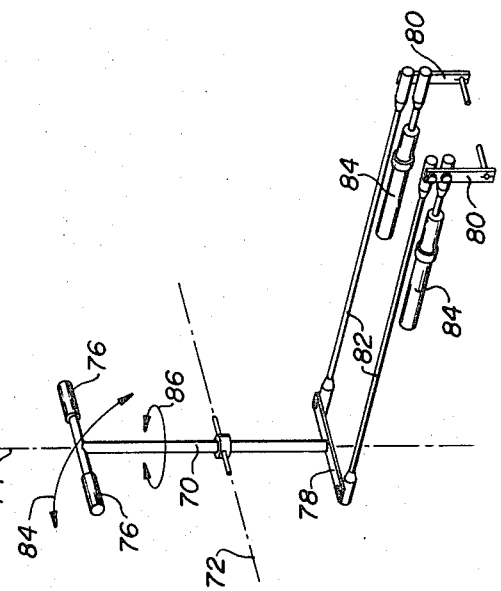
FIG. 5 is a schematic illustration of a portion of the hydrostatic drive control apparatus of the vehicle.

The operator's compartment 64 further includes a T-handle 70 which functions to control the flow of hydraulic fluid from the pump 36 to the motors 46 of the hydrostatic drive of the material handling vehicle 10. Referring particularly to FIG. 5, the T-handle 70 is supported for pivotal movement about horizontal and vertical axes 72 and 74, respectively. The handle 70 includes a pair of handle grips 76 and a lower portion 78 extending parallel to the handle grips 76. Thus, manipulation of the handle grips 76 relative to the axes 72 and 74 results in a directly corresponding motion of the lower portion 78.

The lower portion 78 of the T-handle 70 is coupled to a pair of levers 80 by means of a pair of links 82. The levers 80 function to control the flow of hydraulic fluid between the pumps 36 and the motors 46 of the hydrostatic drive. By this means the T-handle 70 is operable to provide complete control over the direction of operation, the speed of operation, and the steering of the material handling vehicle 10. A pair of springs 84 are provided for returning the levers 80 to their center or nil positions wherein the pumps 36 provide no output.

Consider first manipulation of the T-handle 70 solely about the horizontal axis 72, that is, manipulation of the T-handle 70 in the manner illustrated by the arrow 84. Such action causes movement of both of the levers 80 in the same direction and by the same amount. By this means the motors 46 are actuated in synchronism to propel the vehicle 10 either forwardly or rearwardly along a straight line. The speed of operation of the vehicle depends on the extent of movement of the T-handle 70 in the direction of the arrow 84.

Consider now manipulation of the T-handle 70 solely about the axis 74, that is, manipulation in the manner illustrated by the arrow 86. Such action causes equal and opposite flow of hydraulic fluid from the pumps 36 to the motors 46, whereby the vehicle 10 pivots about its center, but does not move either forwardly or rearwardly. Again, the speed at which the vehicle pivots depends on the extent to which the T-handle 70 is turned in the direction of the arrow 86. It will of course be understood that any combination of manipulations of the T-handle 70 about the axes 72 and 74 is possible, whereby complete control over the direction of operation, the speed of operation, and steering of the material handling vehicle 10 is permitted.

Figure 2:
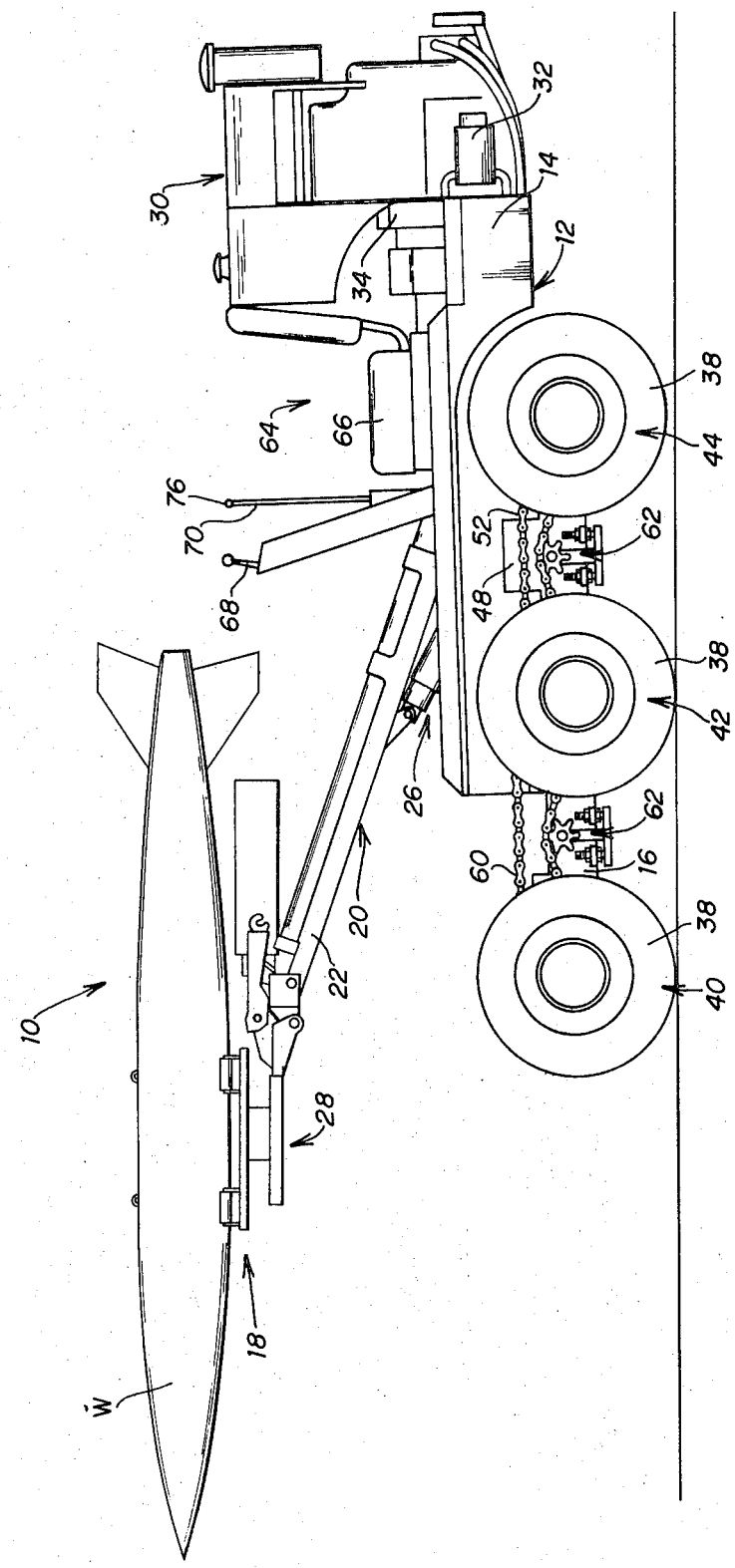
FIG. 2 is a view similar to FIG. 1 showing the vehicle in the loaded condition.

Referring now to FIGS. 1 and 2, it will be noted that the center pair of wheels 42 extend somewhat below a plane 90 extending tangent to the bottom surfaces of the wheels 38 comprising the forward pair of wheels 40 and the rearward pair of wheels 44. Assuming that the load receiving and manipulating mechanism 18 of the vehicle 10 is unloaded, the fact that the prime mover 30 is positioned at the extreme rear end of the frame 12 causes the center of gravity of the vehicle 10 to be located between the wheels 42 and the wheels 44. This causes the frame 12 to rock rearwardly, so that the vehicle 10 is supported entirely on the wheels 42 and the wheels 44. That is, when the load receiving and manipulating mechanism 18 is unloaded, the forward pair of wheels 40 are positioned entirely out of engagement with a hard, smooth surface that supports the vehicle 10.

The foregoing circumstance causes the effective wheel base of the vehicle 10 to comprise the distance between the axis of the center pair of wheels 42 and the axis of the rearward pair of wheels 44, as opposed to the distance between the axes of the wheels 40 and 44. This is highly advantageous in reducing the overall effort that is necessary in order to effect steering of the vehicle 10. It should be noted, however, that in view of the operative interconnections between the three wheels on each side of the vehicle 10 as illustrated in FIG. 4, actuation of the hydrostatic drive to propel the vehicle 10 causes rotation of the forward pair of wheels 40 even though they are not engaged with the surface.

Assuming now that a load such as the weapon W illustrated in FIG. 2 is supported on the load receiving and manipulating apparatus 18 of the vehicle 10, the overall center of gravity of the vehicle is shifted forwardly to a point located between the forward set of wheels 40 and the center set of wheels 42. This causes the frame 12 of the vehicle 10 to rock forwardly, so that the vehicle 10 is supported entirely by the wheels 40 and the wheels 42. At this point the effective wheelbase of the vehicle 10 comprises the distance between the wheels 40 and the wheels 42, whereby the effort required to effect steering of the vehicle is substantially reduced over that which would be required if the wheelbase comprised the total distance between the wheels 40 and the wheels 44. It will again be understood that actuation of the hydrostatic drive to propel the vehicle in the loaded condition causes rotation of the rearward pair of wheels 44, notwithstanding the fact that the wheels 44 are disengaged from the surface which supports the vehicle 10.

Assuming now that the vehicle 10 is operated over an adverse terrain, such as sand, mud, etc., all six wheels 38 engage the adverse surface. This is because the wheels sink into the adverse surface until flotation is achieved. The fact that all six wheels are utilized during operation of the vehicle 10 over adverse terrain comprises a very advantageous feature of the present invention. Thus, not only is superior traction achieved by means of the six driving wheels, but also the total pressure under any individual wheel of the vehicle is substantially reduced.

It will be understood that various modifications can be made in the design of the material handling vehicle illustrated in the Drawings. For example, since the center pair of wheels 42 are always engaged regardless of the weight distribution of the vehicle or the type of terrain over which the vehicle is operated, the vehicle may be propelled solely by means of a center pair of wheels 42, if desired. Also, various commerically available hydrostatic drives, some of which vary markedly in design from the hydrostatic drive illustrated in the drawings, may be utilized to propel the vehicle, if desired.

A very important modification of the basic vehicle design relates to the load receiving and manipulating mechanism. The boom and lift table type of load receiving and manipulating apparatus which has been illustrated has been found to be very useful in aerial weapons loads. However, the present invention is equally applicable to material handling vehicles incorporating conventional forklift masts as well as other types of load receiving and manipulating mechanisms.

Although particular embodiments of the invention have been illustrated in the accompanying drawings and described in the foregoing detailed description, it will be understood that the invention is not limited to the embodiments disclosed, but is capable of numerous rearrangements, modifications, and substitutions of parts and elements without departing from the spirit of the invention.

What is claimed is:

1. A material handling vehicle comprising:
   a frame;
   a prime mover mounted at one end of the frame;
   a mechanism mounted on the frame for receiving a load at the opposite end thereof from the prime mover and for manipulating the load vertically relative to the frame;
   six wheels comprising three pairs of opposed wheels positioned at spaced points along the opposite sides of the frame for supporting the vehicle;
   the wheels comprising the center pair extending beneath the wheels at the opposite ends of the frame so that during operation over adverse terrain the vehicle is supported by all six wheels and so that during operation on a hard, smooth surface the vehicle is supported either by the center and rearward pairs of wheels or by the center and forward pairs of wheels depending on weight distribution; and
   transmission means operatively interconnecting the prime mover and at least the center pair of wheels so that the wheels are operative to propel the vehicle.

2. The material handling vehicle according to claim 1 wherein the transmission means operatively interconnects the prime mover and all six wheels.

3. The material handling vehicle according to claim 2 wherein the orientation of all six wheels relative to the frame is fixed and wherein the transmission means functions to steer the vehicle by independently regulating the direction and speed of operation of the three wheels on one side of the vehicle and the direction and speed of operation of the three wheels on the opposite side of the vehicle.

4. The material handling vehicle according to claim 3 wherein the load receiving and manipulating means comprises a boom pivotally supported on the frame for manipulation between a position wherein it extends between at least the forward pair of wheels and a position wherein it extends above at least the forward pair of wheels, a lift table mounted at the distal end of the boom for receiving and supporting the load, and means adapted for actuation by the prime mover for pivoting the boom relative to the frame.

5. A material handling vehicle comprising:
a frame;
six wheels mounted on the frame for supporting the vehicle and including forward, center, and rearward pairs of wheels positioned at spaced points lengthwise of the frame;
said center pair of wheels extending somewhat below a plane extending tangent to the bottoms of the forward and rearward pairs of wheels;
a prime mover mounted at the extreme rear end of the frame and adapted to pivot the frame rearwardly so that the vehicle is normally supported on the center and rearward pairs of wheels;
means mounted on the frame for actuation by the prime mover to receive a load at the front end of the frame and to vertically manipulate the load, whereby the frame is pivoted forwardly so that the vehicle is supported on the forward and center pairs of wheels; and
hydrostatic transmission means operatively interconnecting the prime mover and all six wheels for propelling the vehicle and for manipulating the vehicle by means of skid steering.

6. The material handling vehicle according to claim 5 wherein the transmission means further comprises:
a pair of hydraulic pumps each operatively connected to the prime mover for actuation thereby;
a pair of hydraulic motors each adapted for actuation by one of the hydraulic pumps; and
means forming a driving connection between each of the hydraulic motors and the three wheels mounted on one side of the frame.

7. The material handling vehicle according to claim 5 wherein the load receiving and manipulating means further comprises:
a boom pivotally supported on the frame for manipulation between a position wherein it extends between the wheels on the opposite sides of the frame and a raised position;
means mounted on the distal end of the boom for receiving and supporting a load; and
means driven by the prime mover for selectively pivoting the boom relative to the frame and thereby selectively raising and lowering the load receiving and supporting means.

8. The material handling vehicle according to claim 7 wherein the transmission means further comprises:
dual hydraulic pumps both driven by the prime mover;
dual hydraulic motors each individual to and driven by the output of one of the pumps; and
means forming a driving interconnection between each motor and the three wheels on one side of the vehicle.

9. A material handling vehicle comprising:
a frame including a main portion and a pair of spaced apart portions extending forwardly from the main portion;
a boom pivotally supported at the forward end of the main portion of the frame and extending forwardly therefrom for pivotable movement between a position wherein it extends between the forwardly extending portions of the frame and a position wherein it extends above the forwardly extending portions;
a lift table mounted on the distal end of the boom for receiving and supporting a load;
six wheels each mounted on the frame in a fixed orientation with respect thereto for supporting the vehicle and including a rearward pair of wheels positioned under the main portion of the frame, a forward pair of wheels positioned at the front ends of the forwardly extending portions of the frame, and a center pair of wheels positioned between the forward and rearward pairs;
said center pair of wheels extending below a plane extending tangent to the bottoms of the forward and rearward pairs of wheels;
an operator's compartment mounted on the main portion of the frame behind the pivotal connection of the boom thereto and directly above the rearward set of wheels;
a prime mover mounted at the extreme rear end of the frame behind the operator's compartment;
whereby during operation of the vehicle over adverse terrain the vehicle is supported by all six wheels and during operation over a hard, smooth surface the vehicle is supported either by the rearward and center pairs of wheels or by the center and forward pairs of wheels, depending on weight distribution;
hydrostatic transmission means operatively interconnecting the prime mover and all six wheels for propelling the vehicle by means of the wheels and for steering the vehicle by selectively operating the three wheels on one side of the frame at a different direction and/or speed of operation from the direction and speed of operation of the three wheels on the opposite side of the frame; and
means adapted for actuation by the prime mover for selectively pivoting the boom and thereby selectively raising and lowering the lift table.

10. The material handling vehicle according to claim 9 wherein the transmission means further comprises:
a pair of hydraulic pumps driven by the prime mover;
a pair of hydraulic motors each adapted for actuation by one of the hydraulic pumps; and
drive means operatively interconnecting the three wheels on each side of the frame to one of the hydraulic motors.

11. The material handling vehicle according to claim 10 wherein the three wheels, the associated hydraulic motor, and the drive means on each side of the vehicle are mounted on a subframe adapted for connection to the frame of the vehicle.

12. The material handling vehicle according to claim 11 further including a control lever mounted in the operator's compartment for selective rotation about horizontal and vertical axes to control the flow of hydraulic fluid between each hydraulic pump and its corresponding hydraulic motor and thereby control the direction of operation, the speed of operation, and the steering of the vehicle.

13. The material handling vehicle according to claim 12 further characterized by:
- an additional hydraulic pump driven by the prime mover;
- a hydraulic cylinder operatively connected between the frame and the boom; and
- valve means mounted in the operator's compartment for controlling the flow of hydraulic fluid between the additional pump and the hydraulic cylinder and thereby selectively pivoting the boom relative to the frame of the vehicle.

* * * * *